Sept. 21, 1965   N. D. TRBOVICH   3,207,524
SEAL
Filed July 23, 1962

INVENTOR.
NICHOLAS D. TRBOVICH
BY
Christel & Bean
ATTORNEYS

United States Patent Office 3,207,524
Patented Sept. 21, 1965

3,207,524
SEAL
Nicholas D. Trbovich, 59 Fieldcrest Court,
West Seneca, N.Y.
Filed July 23, 1962, Ser. No. 211,569
4 Claims. (Cl. 277—206)

This invention relates generally to the seal art, and more particularly to a new and useful seal particularly designed for use as a static metal seal interchangeable with rubber O-rings.

Metal seals offer certain advantages over rubber O-rings, and are being used in place thereof for many purposes. Such seals may have a generally V-shaped configuration, with generally parallel-sided arms diverging from an apex, and perform nicely under relatively low pressure conditions. Under relatively high pressure conditions, however, such seals tend to fracture at the apex, and fail.

The problem of strengthening such seals, for use in high pressure installations, is complicated by the limitations imposed when the seal is to be interchangeable with rubber O-rings. Such limitations comprise the size of the existing cavity, and the permissible flange loading. In other words, the size of the seal cannot exceed that of the O-ring cavity, and the seal must not require a flange loading exceeding that for which the installation is designed.

The primary object of my invention is to provide a metallic seal which is interchangeable with rubber O-rings under all pressure conditions normally encountered, while minimizing flange loading and requiring no change in cavity dimensions. By way of example, metallic seals constructed in accordance with my invention will withstand steady pressures in excess of 30,000 p.s.i. and pressure cycling from 0 to 6,000 p.s.i. at 3 second intervals.

Another object of my invention is to accomplish the foregoing in a simple and relatively inexpensive construction, which is very durable and dependable in operation.

In one aspect thereof, a seal constructed in accordance with my invention is characterized by the provision of a member of generally V-shaped transverse section having an apex and wall diverging therefrom, the walls having surface-engaging sealing portions adjacent the outer ends thereof, wherein the wall portions intermediate the apex and the outer ends of the walls are thicker than the outer end portions of said walls, thereby providing reinforced intermediate wall sections.

The foregoing and other objects, advantages and characterizing features of a seal constructed in accordance with my invention will become clearly apparent from the ensuing detailed description of two, presently preferred illustrative forms thereof, taken in conjunction with the accompanying drawing wherein like reference numerals denote like parts throughout the various views, and wherein.

Figures 1, 2:
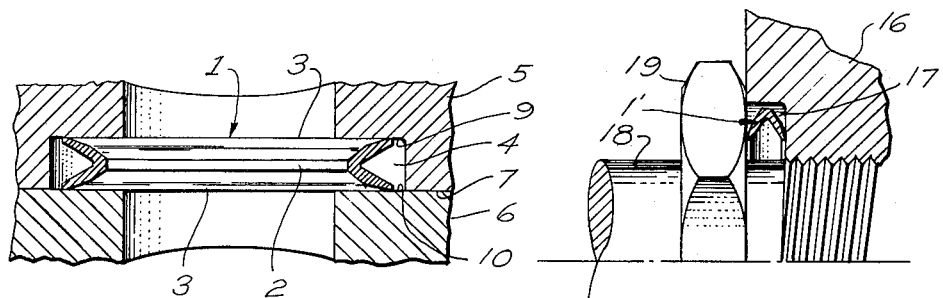
FIG. 1 is a fragmentary, sectional view of a joint incorporating one form of seal of my invention, to seal a vacuum.
FIG. 2 is a fragmentary, quarter sectional view of another installation, utilizing another form of seal of my invention.
Figures 5, 6:
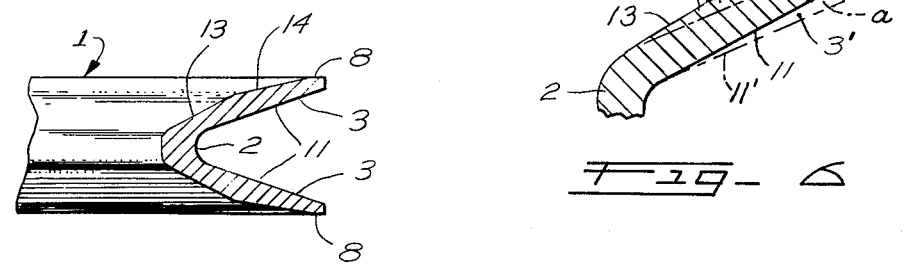
FIG. 5 is a fragmentary, transverse sectional view, on an enlarged scale, of the seal of FIG. 1.
FIG. 6 is a fragmentary, schematic view, on an enlarged scale constrasting the seal of this invention with a prior art seal.

Referring now in detail to FIGS. 1 and 5 of the accompanying drawing, there is shown a static, metallic seal of my invention, generally designated 1. Seal 1 has a generally V-shape transverse section, provided by an apex 2 and walls 3 diverging therefrom. Seal 1 is positioned within a cavity 4, in a member 5 which abuts another member 6 providing a joint 7 therebetween, and the joint 7 is sealed by the seal 1.

Seal 1 is of inverted apex configuration, the installation of FIG. 1 being particularly adapted for vacuum applications in which the seal functions to keep out the atmosphere. To this end, the outer end surfaces 8 of walls 3 are formed to engage the wall 9 of cavity 4 and the end face 10 of member 6, in sealing contact therewith. Ends 8 are flattened, so as to be generally parallel in use and thereby provide a substantial area of sealing contact.

It is contemplated that the seal will have a metal or plastic coating which will deform and cold flow into any surface irregularities in the surfaces 9 and 10, to provide a good seal therewith. Such coatings are known, and therefore are not shown inasmuch as my invention is concerned with the particular configuration of the seal itself.

The inner surface 11 of walls 3 comprise flat, diverging surfaces, and it has been customary to make the outer surfaces of walls 3 parallel to the inner surfaces 11. However, such constructions have a tendency to fail, adjacent the apex 2, presenting the problem of reinforcing or strengthening the seal without exceeding the dimensions of the cavity 4, and without increasing the loading on member 6. These criteria, which must be met if the seal is to be interchangeable with a corresponding O-ring, eliminate the possibility of simply increasing the thickness of the apex, because the seal would exceed the cavity width. In like manner, increasing the overall thickness of the walls 3 is not possible, without increasing the loading on member 6.

This problem is effectively solved by the instant invention, wherein the walls are provided with intermediate reinforced sections. These reinforced sections are produced by the outwardly converging, outer surfaces 13 and 14 of walls 3, which converging surfaces form apexes spaced inwardly from the surface-engaging outer ends 8. By using substantially the same total volume of material as in parallel-sided configurations, but redistributing it as shown, a much stronger construction is provided.

This is perhaps best understood by reference to FIG. 6, indicating in broken lines a parallel-sided configuration of the prior art wherein the walls 3' have outer sides 12 parallel to the inner sides 11' thereof. In order to avoid failure, but remain within the design indicated above, I wish to provide substantially no greater volume of material than before, and redistribute it for greater strength. To this end, I remove material from the part a, and add it to the part b, whereby the outer ends of the walls are of decreased thickness. The greatest thickness is provided in the mid-portion of each wall 3, between apex 2 and the surface-engaging portion 8, but the entire inner portion of each wall is thickened, thereby reinforcing the seal adjacent apex 2, which was the weak point.

It has been found that, with this construction, the necessary flange loading is well below that required by metallic tubular O-rings. Also, the outside dimensions of the seal are not increased, whereby a seal of this design is also truly interchangeable with rubber O-rings. In addition, these seals accommodate static pressures exceeding 30,000 p.s.i., and can withstand repeated cycling from 0 to 6,000 p.s.i. at 3 second intervals.

FIG. 2 shows another application, in which a member 16, containing a cavity 17, threadedly receives a shaft 18 having a boss 19 against which a seal 1' of my invention egages. The seal 1' is identical in cross-sectional configuration with the seal 1, and functions in the same manner, but the apex opens inwardly, rather than radially outwardly.

Figures 3, 4:
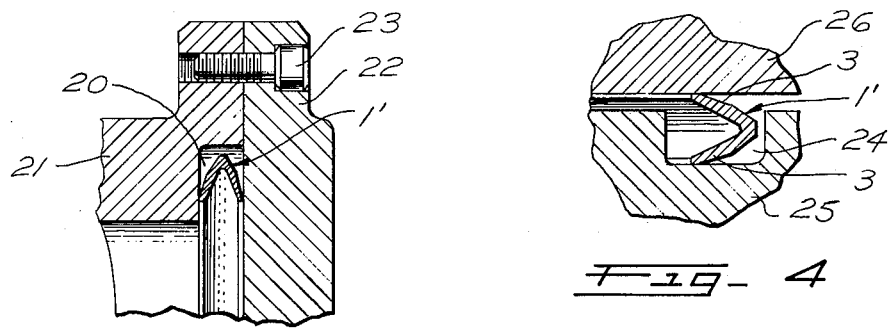
FIG. 3 is a fragmentary, sectional view of still another installation, utilizing the seal of FIG. 2.
FIG. 4 is a fragmentary, sectional view of another installation, prior to sealing engagement, showing the seal of FIG. 2 in unstressed condition within a seal cavity.

FIG. 3 shows a seal 1' of my invention positioned in the cavity 20 of a member 21 to which an end flange 22 is secured, as by bolts 23. Here again, a leak-free seal is provided, but with the loading on the flange 22 being no greater than with conventional, prior art static seals, and being less than the metallic O-ring which normally would occupy the cavity 20.

FIG. 4 illustrates the unstressed condition of a seal 1' of my invention, positioned in a cavity 24 of a member 25 adapted to be joined to another member 26. The unstressed distance between the outer ends of walls 3 is greater than the depth of the cavity, whereby upon making the connection the seal walls are compressed, thereby stressing the seal wihch reacts to engage the contacting surfaces for sealing effect and cold flow whatever plating material may be present into the surface irregularities of members 25 and 26. The same obviously is true of seal 1 of FIGS. 1 and 5. FIG. 4 also further illustrates the limitations imposed by a standard O-ring cavity 24.

Accordingly, it is seen that my invention fully accomplishes its intended objects. While I have disclosed only two forms of my invention, in only a limited number of applications, that has been done by way of illustration only without thought of limitation. Variations and modifications will occur to those skilled in the art, and are intended to be included within the scope of the appended claims. Similarly, the seal of my invention is usable for purposes other than those specifically referred to, and such uses are intended to be included.

Having fully disclosed and completely described my invetion, together with its mode of operation, what I claim as new is:

1. A seal adapted to engage opposed surfaces comprising an annular metallic member of generally V-shaped transverse section having an apex and walls diverging from and terminating in ends remote from said apex, said member comprising in transverse section substantially flat generally parallel surface-engaging sealing portions on the outer sides of said walls closely adjacent the ends thereof remote from said apex, the surface-engaging sealing action of said walls normally being confined to said portions, the inner sides of said walls being substantially rectilinear and substantially continuously diverging from said apex to said remote wall ends, the outer side of each of said walls comprising a pair of substantially rectilinear wall surfaces, one wall surface terminating at said apex and the other wall surface terminating at and converging with said sealing portion, said outer wall surfaces converging outwardly from said apex and said sealing portion to provide a wall section of greatest thickness at a point spaced between said apex and said sealing portion, said walls between said apex and said points of greatest thickness being thicker than the remote end portions of said walls, thereby reinforcing said seal adjacent said apex.

2. A seal as set forth in claim 1, wherein said walls diverge radially outwardly from the center of said annular member.

3. A seal as set forth in claim 1, wherein said walls diverge radially inwardly toward the center of said annular member.

4. A seal as set forth in claim 1, wherein said member is symmetrical about a plane bisecting said apex.

References Cited by the Examiner

UNITED STATES PATENTS

| | | | |
|---|---|---|---|
| 1,519,111 | 12/24 | Brownell | 277—206 X |
| 2,264,147 | 11/41 | Dunlevy | 277—205 X |
| 2,420,929 | 5/47 | Buffington et al. | 277—205 |
| 2,455,202 | 11/48 | Ware | 277—206 X |
| 2,509,363 | 5/50 | Page | 277—206 X |
| 2,533,742 | 12/50 | Poltovak | 277—205 |
| 3,013,830 | 12/61 | Milligan | 277—205 |

FOREIGN PATENTS

| | | |
|---|---|---|
| 462,424 | 1/14 | France. |
| 337,039 | 5/21 | Germany. |

LEWIS J. LENNY, *Primary Examiner.*

EDWARD V. BENHAM, *Examiner.*